I. V. BLACKWELL.
Clover Huller.
No. 1,868.
Reissued Feb. 14, 1865.
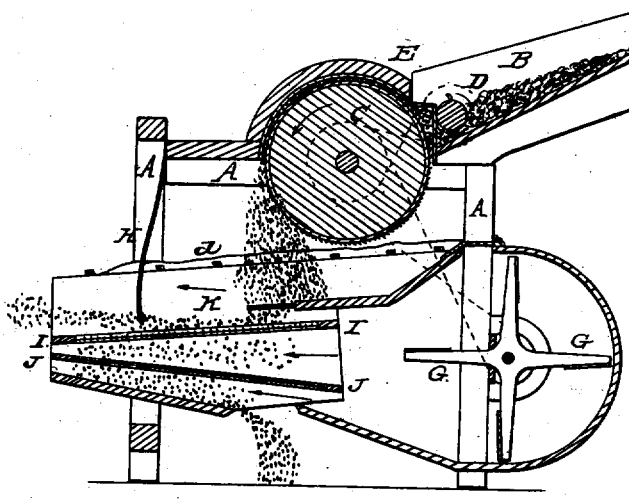
Fig. 3
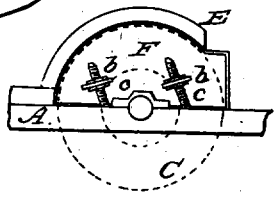
Fig. 4
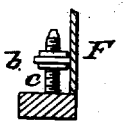
Fig. 2
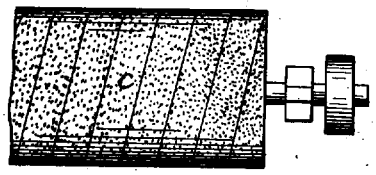
Fig. 5
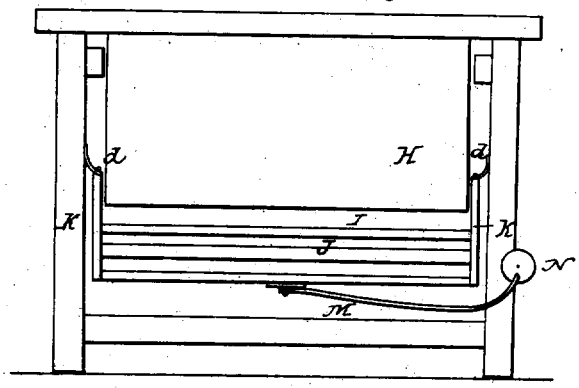
N. PETERS. Photo-Lithographer, Washington, D.C.

UNITED STATES PATENT OFFICE.

EMMA A. BLACKWELL, OF OVID, NEW YORK, ADMINISTRATRIX OF THE ESTATE OF ISHI V. BLACKWELL, DECEASED.

IMPROVED MACHINE FOR HULLING CLOVER.

Specification forming part of Letters Patent No. 19,745, dated March 30, 1858; Reissue No. 1,868, dated February 14, 1865.

*To all whom it may concern:*

Be it known that ISHI V. BLACKWELL, deceased, late of Ovid, in the county of Seneca and State of New York, did invent a new and Improved Machine for Hulling and Cleaning Clover-Seed; and I, the widow of the said I. V. BLACKWELL, deceased, to whom the said patent has been set off, by virtue of the statute in such case made and provided, do hereby declare that the following is a full, clear, and exact description of its construction and operation, reference being had to the accompanying drawings, making part of this specification, and to the letters of reference marked thereon.

Similar letters refer to like parts in all the figures.

To enable others to make and use said invention, I will proceed to describe its construction and operation.

Figure 1 is a vertical section of said machine, and shows the general arrangement.

A A is the frame of the machine.

B is the hopper, in which the heads or bolls of the clover are fed to the cylinder C.

D is a feed-roller, which, being arranged with teeth, serves to distribute the mass and enable it to enter between the cylinder and concave regularly.

E is the concave, placed above the cylinder, so that stones, nails, and other foreign substances will fall by their weight, and not pass through and injure the teeth of the cylinder and concave.

The cylinder may be made of wood or metal. If of wood, it should be thoroughly seasoned to prevent shrinkage. After being turned to a true cylindrical form it is covered with a metallic sheathing, in order to give a scouring or abrasive surface, as follows: I use thin metallic plates or strips, usually hoop-iron, about one and one-fourth inch wide and of the usual thickness of that kind and size of iron. On one side of this are raised teeth, like those of a coarse rasp, by using a sharp triangularly-pointed punch for the purpose. One angle of the punch is held obliquely against the surface on which the teeth are to be raised. A blow makes an indentation into the surface, and the metal is forced up into a tooth, with a face perpendicularly to the surface and terminating in a sharp elevated edge. These teeth are disposed in rows ranging obliquely across the strips at an angle of about thirty degrees from the length. The rows are about one-fourth of an inch apart, and the teeth in the rows are the same distance apart. Care should be taken to make all the teeth alike and of the same height, which is about that of the thickness of the metal. The strips, being thus prepared, are next suitably hardened by the usual process of case-hardening with prussiate of potash, and they are applied as a sheathing for the cylinder and concave in the following manner:

The metal is wound spirally around the cylinder, as shown at C, Fig. 2, (which exhibits a portion of the cylinder detached, and shows the manner of winding on the strips, but not the form or positions of the teeth,) the helix being continued from one end to the other till the entire surface is uniformly covered. It is secured by screws at intervals, as required, with heads countersunk in the metal, and care must be taken to make every part adhere closely to the cylinder, otherwise a true circle will not be preserved. The concave is sheathed with the same; but the direction of the strips or plates is at right angles to its longitude, or the strips follow the direction of the revolution of the cylinder. These strips may also be made of steel and hardened in the usual manner; but that is more expensive than to make them of iron, as I have described.

The faces of the teeth of the cylinder are opposed to those of the concave; but the difference of their positions on the two causes the points of one to pass those of the other somewhat obliquely, or in a raking direction, which tends to prevent the breaking and destruction of the seed, which might result from direct contact of those points, and increases the grating process by which the seed is freed from the chaff.

The concave is adjusted to the cylinder by a device shown in Fig. 3. It is attached at either end to a metal plate having two ears or projections from the side *b b*, F being the end plate, and E, the concave. Through these ears pass the inclined screws *c c* from the frame A, and a nut above and below each ear allows the concave to be raised or lowered at pleasure to adapt it to the cylinder. The angle of inclination of the screws is such as to keep the concave at all times concentric to the cylinder.

Fig. 4 represents a section of the end plate, F, and frame A, showing the ear *b* and screw *c*.

The operation of the rasp-like surfaces of the concave and cylinder, one acting obliquely to the other, is to grate the chaff from the seed, and this is done so effectually that it hulls damp chaff as well as dry, though it does not separate as well under the blast when wet.

Six bushels of seed per hour have been hulled and cleaned by this machine with the cylinder run at a speed of seven hundred revolutions per minute.

The seed by passing over the cylinder falls from a greater elevation, and therefore is exposed to a greater amount of the blast generated by the fan G. As clover-seed is very light, it will not receive a very strong blast without being blown off with the dust and chaff. To overcome this difficulty, a curtain, H, is suspended from the top of the back frame of the machine, of a size that very nearly or quite closes that portion of the machine above the screens I J. The lower end of this curtain has a rod wound in it of a weight sufficient to prevent the force of the blast blowing it far from the perpendicular, and yet such as to allow it to yield measurably to that force, so as not too suddenly to check it. This seems to prevent any seed from being wasted, and also to modify the blast so as to adapt it to the purpose and to spread it upward, so as to act more immediately on the grain and chaff as they leave the cylinder.

The shoe K is lined with cloth or leather, *d d*, Figs. 1 and 5, to prevent any waste of seed through the sides and crevices.

Fig. 5 is an elevation of the rear end of the machine, showing the weighted curtain H and screens I and J.

The seed is separated from the fine dust by the blast and cleaned of the coarse chaff by passing through the screens I and J, during which time it is also exposed to the blast till it leaves the machine at L in marketable order. The power is applied to the cylinder, a cross-band from which drives the feed-roller D and another band, G′. The shoe is vibrated by the rod M, hung eccentrically to the pulley N on a side, too, which is geared with the shaft of the fan G.

The great difficulty that has heretofore been encountered in the construction of an effective clover-machine was to make a proper grinding-surface, which, while it should effectually grind or tear asunder the covering that envelops the seed, should not at the same time crush or injure the seed. The requirement of these two apparently antagonistic properties constituted for a long time an insuperable obstacle to a successful machine. The plan generally adopted previously to the invention of said BLACKWELL was to make a roughened surface, like that of a nutmeg or starch grater, by punching round holes through sheet-iron with a pointed instrument, as in the machines patented to John Boulton on the 9th of January, 1823, and to William Rowe on the 25th of April, 1834; but the plan was only partially successful. The unequal length of the teeth would crush the seed, while a large proportion of the chaff would pass through unground, and the surfaces would in a short time be worn smooth. The capacity of such mills was limited to grinding three or four bushels in a day.

The improvements of said BLACKWELL were the result of several years' experimenting with different kinds and forms of teeth. As finally made by him, there is no difficulty in so adjusting the concave that the points of the teeth shall seize hold of and tear asunder the hulls and allow the seed to fall between the rows without injury; but it is essential that the form and sharpness of the teeth be preserved, and this is attained by the process of case-hardening, as described. So successful have been these improvements in the teeth that clover-mills are now able to do perfectly in hours what before was only imperfectly done in as many days.

I do not claim these teeth nor the case-hardening of them, separately and of themselves; but it is their application and adaptation to clover-machines, or their combination with clover-machines, that the said ISHI V. BLACKWELL devised and successfully made.

What I do claim as the invention of the said ISHI V. BLACKWELL, and desire to secure by Letters Patent, is—

1. The construction of the grinding-surfaces of clover-machines with teeth made and case-hardened, substantially as described.

2. The application of the gravitating curtain H at the point of eduction of the blast, for the purpose of modifying and diffusing the same and preventing the waste of seed, substantially in the manner shown and described.

3. The combination and arrangement of the overshot grating-cylinder C, constructed as described, with the concave E, feed-roller D, and blast-generator G, the whole operating conjointly in the manner and for the purpose herein described.

EMMA A. BLACKWELL.

Witnesses:

ISAAC I. COVERT,
JAMES FOSTER.